United States Patent [19]
Henry et al.

[11] Patent Number: 4,802,030
[45] Date of Patent: Jan. 31, 1989

[54] HEAD-TAPE ALIGNMENT APPARATUS WITH A TAPE EDGE FIND OPERATION

[75] Inventors: Steven G. Henry, Fort Collins; Dan S. Johnson, Greeley; Kurt E. Spears, Windsor; Mark E. Wanger, Fort Collins, all of Colo.

[73] Assignee: Hewlett-Packard Company, Palo Alto, Calif.

[21] Appl. No.: 878,165

[22] Filed: Jun. 25, 1986

[51] Int. Cl.⁴ .......................... G11B 5/56; G11B 5/584
[52] U.S. Cl. .......................................... 360/60; 360/46; 360/75; 360/78.13; 360/77.12
[58] Field of Search .................. 360/75, 77, 78, 60, 360/46, 67, 31; 369/56, 57

[56] References Cited

U.S. PATENT DOCUMENTS

| | | | |
|---|---|---|---|
| 4,422,111 | 12/1983 | Moeller et al. | 360/72.1 |
| 4,476,503 | 10/1984 | Solhjell | 360/75 |
| 4,586,094 | 4/1986 | Chambors | 360/77 |

*Primary Examiner*—Raymond F. Cardillo
*Assistant Examiner*—Steven R. Garland
*Attorney, Agent, or Firm*—William W. Cochran

[57] ABSTRACT

A solution to accurately aligning a read-write head over a previously written data track on both a write protected and not write protected tape is disclosed. A control unit, preferably a programmed microprocessor, electronically provides a sequence of control outputs to move the tape and step the head to locate an edge of the tape. The control unit then moves the head a fixed distance to be over a selected data track. A threshold circuit controls the readout of data from the head of the tape in such a way as to improve edge find reliability.

14 Claims, 10 Drawing Sheets

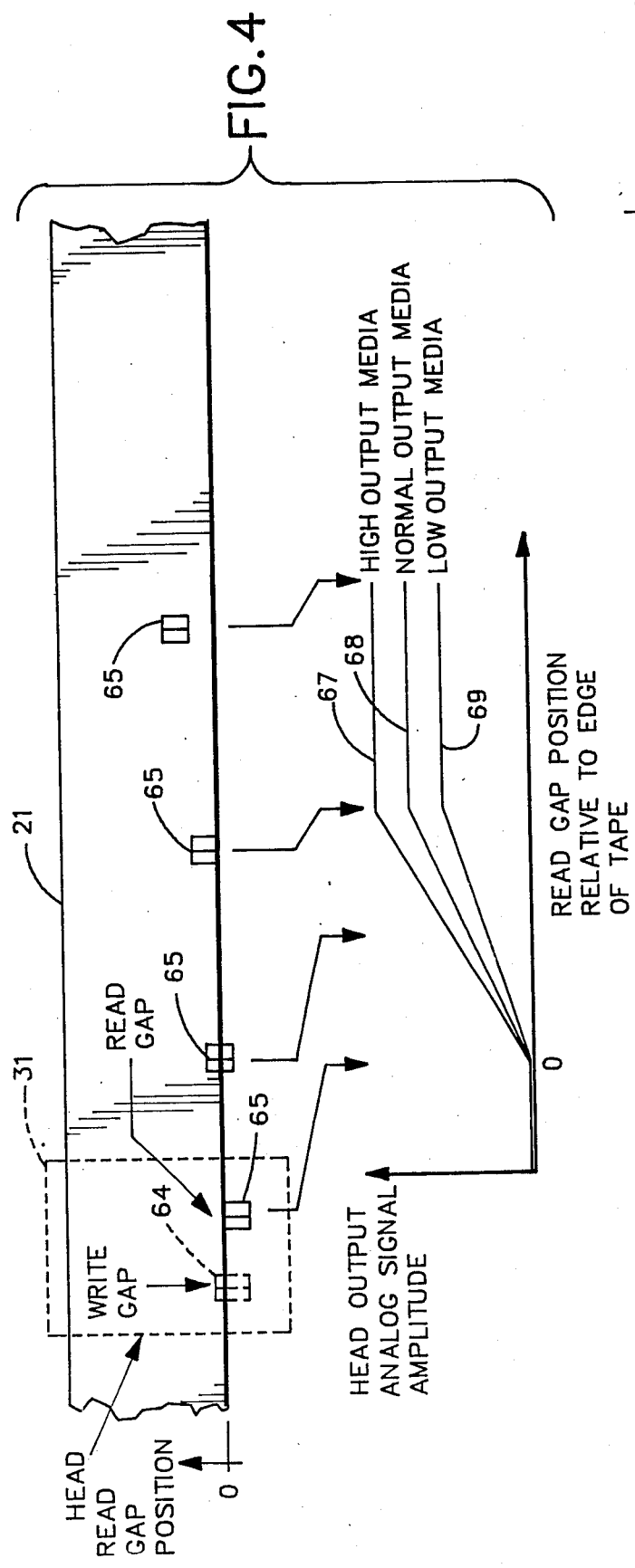
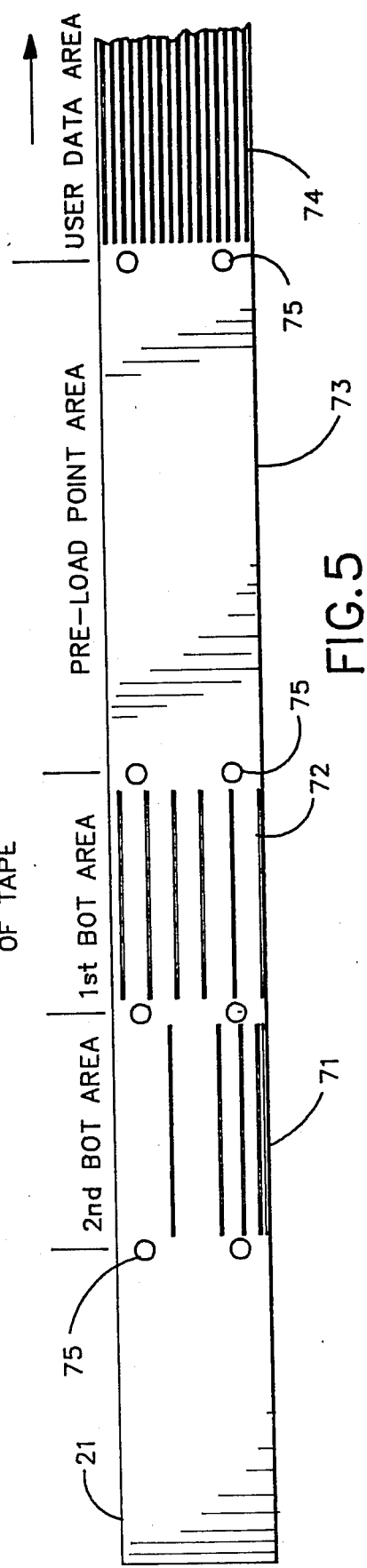

HEAD-TAPE ALIGNMENT APPARATUS WITH A TAPE EDGE FIND OPERATION

TECHNICAL FIELD

This invention relates to a novel apparatus for aligning a read-write head with a previously written data track on a magnetic tape to provide improved data reliability.

BACKGROUND ART

The increased usage of the personal computer has created a considerable demand for cartridge tape drives that can back up fixed disks at a relatively low cost. One of the most important variables involving the reading of a magnetic tape is the alignment of the head over a data track previously written on the tape. Currently, most tape drives depend on a mechanical alignment to position the head over the data tracks. Most mechanical schemes suffer from drift especially with temperature and humidity variations. Prior art alignment schemes require initial factory adjustments that may not have been made correctly.

DISCLOSURE OF INVENTION

In accordance with the present invention there is provided apparatus for aligning a head with a previously written data track on a tape. The apparatus includes a control unit providing control outputs for sequentially moving the tape and stepping the head for electronically aligning the head with the edge of the tape during the tape loading sequence. After electronically locating the edge of the tape the head is moved a known distance from the located edge to be over a selected previously written data track. A threshold circuit preselects the level of amplitude necessary to allow a digital read signal output. The preselected level of threshold of the read channel causes a sufficient output signal amplitude when only a small portion of the read gap is on the tape. This provides a high degree of accuracy in locating the tape edge on different tapes. The control unit also provides a write data output to write a data stripe on the tape for use in locating the edge of a write protected tape.

BRIEF DESCRIPTION OF THE DRAWINGS

FIG. 4 is a graph showing the relationship of head read gap position on the tape to the head output analog signal amplitude and the relationship to the head read gap position relative to an edge of the tape.

FIG. 5 is a segment of the tape showing the load sequence data patterns and location holes.

DETAILED DESCRIPTION

Figure 1:
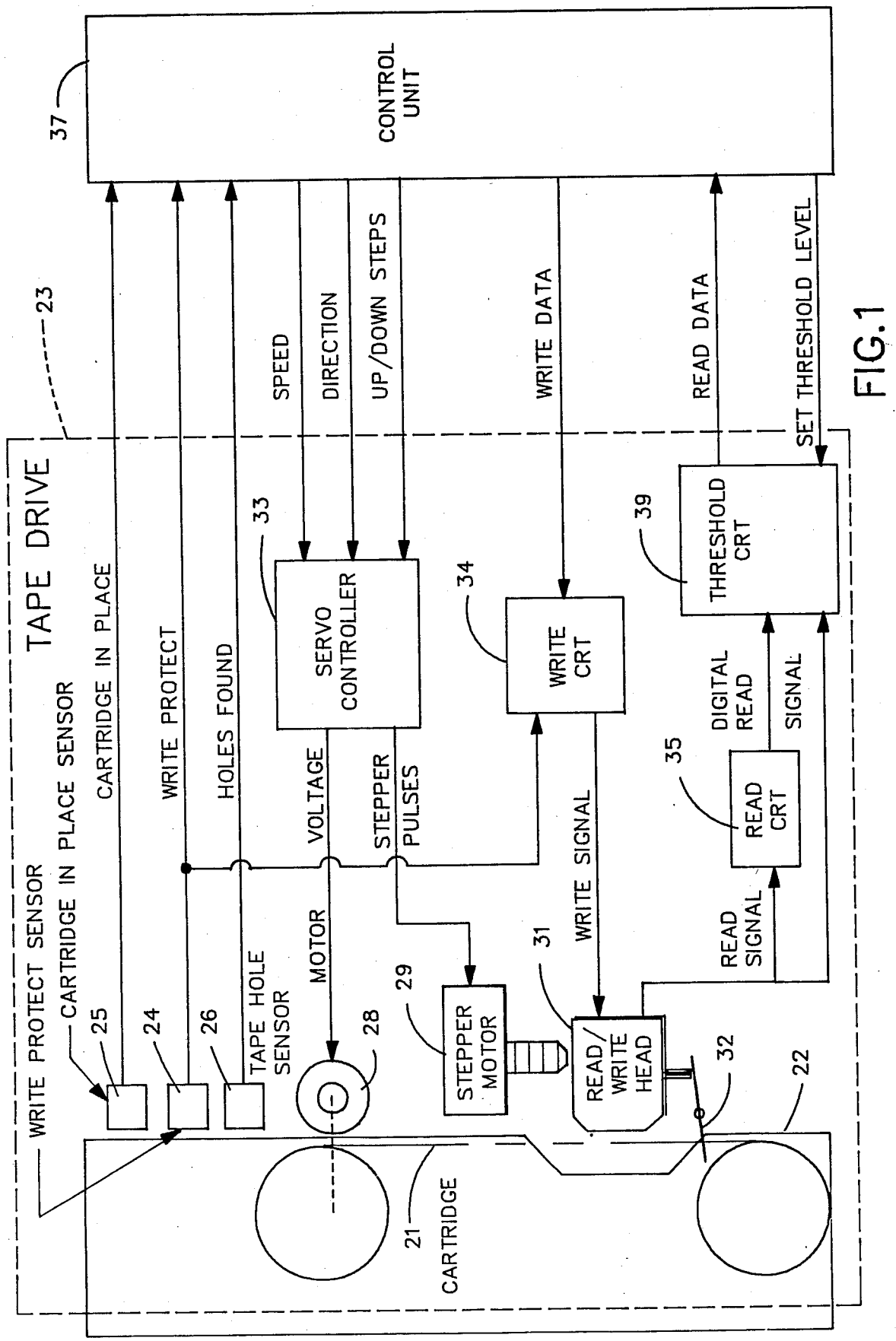
FIG. 1 is a schematic diagram showing apparatus of the present invention.

Referring now to the drawings in FIG. 1 there is schematically shown a tape 21 in a cartridge 22 mounted in a tape drive 23. The tape drive 23 has a write protect sensor 24, a cartridge in place sensor 25, and a tape hole sensor 26. A tape motion motor 28 moves the tape and a stepper motor 29 steps a rear-write head 31 up and down relative to the tape. A locking device 32 locks the cartridge in place in response to the head being moved up from the bottom position of its travel. An electronic portion of the tape drive includes a servocontroller 33 which provides motor voltage to motor 28 and stepper pulses to motor 29 and write circuit 34 which applies a write signal to the head and a read circuit 35 which receives a read signal from the head.

A control unit 37 provides control outputs for sequentially operating the head and moving the tape and for actuating the read and write circuits as is described in detail hereafter. Preferably, the control unit is a microprocessor-based controller. A Motorola 6809 microprocessor is suitable for this purpose. A threshold circuit 39 is connected to the read circuit 35 to control the passage of the read signal to the control unit 37.

Figures 2, 3:
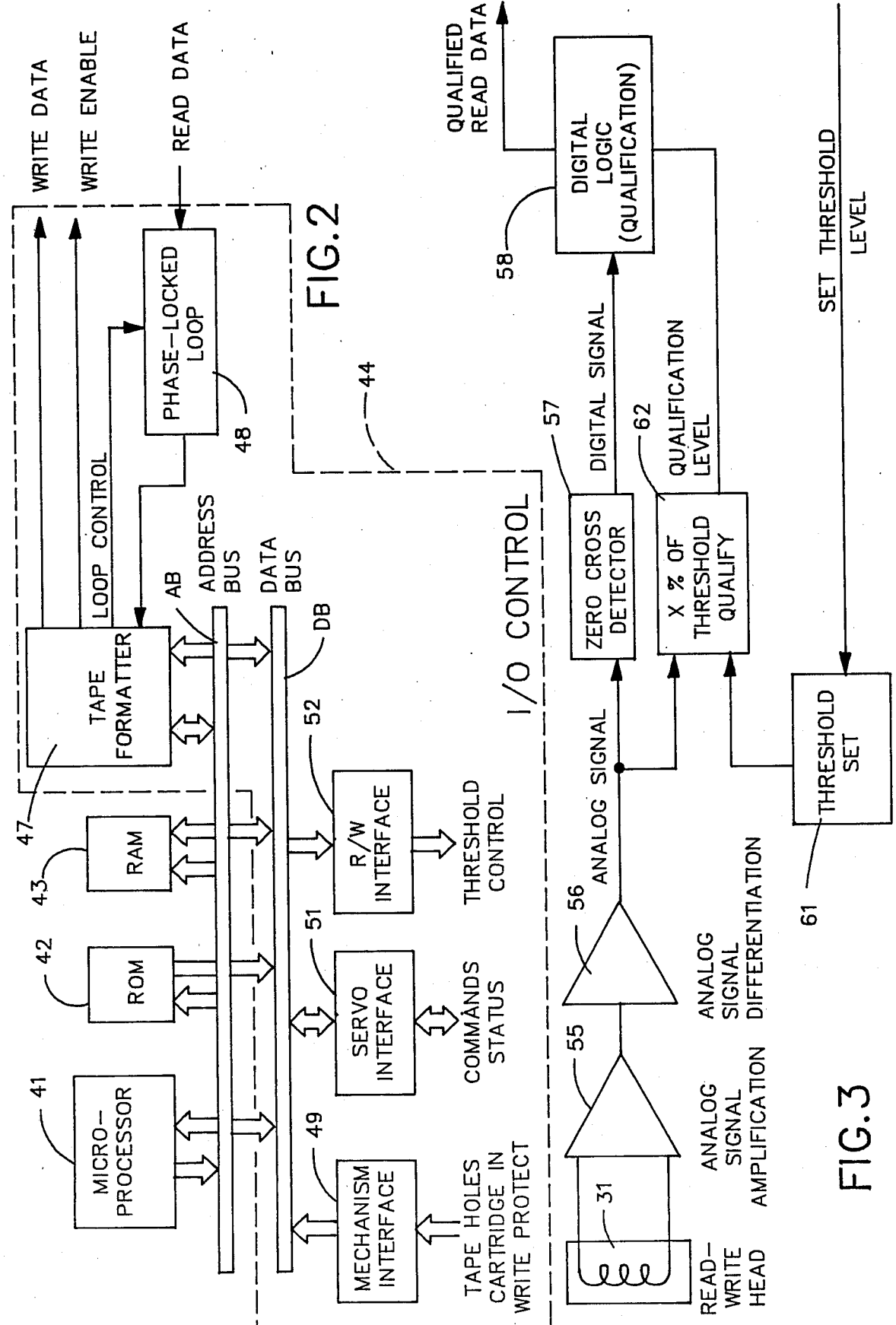
FIG. 2 is a schematic diagram showing a microprocessor-based controller for the control unit.
FIG. 3 is a schematic diagram showing more details of the read and threshold circuits.

Referring now to FIG. 2 control unit 37 is shown to have a microprocessor 41 which is interfaced with peripheral devices through an address bus AB, data bus DB, read-only memory ROM 42, random access memory RAM 43, and input/output control 44. The ROM 42 is stored with programs for controlling the microprocessor 41 which receives the necessary external data from designated input lines according to the program or performs arithmetic operations by transferring data to and from RAM 43 which serves as data memory and if necessary the microprocessor 41 delivers processed data to designated output lines. Flow charts of the programs stored in ROM 42 are given in FIGS. 9–14.

The input-output control 44 is shown to include a tape formatter 47, phase-locked loop 48, mechanism interface 49, servointerface 51 and read-write interface 52 with the associated input and output signals being designated.

Referring now to FIG. 3 there is shown a more detailed block diagram of the read circuit and threshold circuit. The read-write head 31 is coupled to an amplifier 55 which amplifies the read signal which is an analog signal and this analog signal is then passed through a differentiator 56. The differented analog signal is passed through a zero cross detector 57 to provide a digital signal which in turn is applied to digital logic 58.

In the threshold circuit a threshold set 61 receives a set threshold level output command from the control unit 37 and which in turn applies a signal to a X% of threshold qualify 62 which receives the analog signal from differentiator 56 and in turn produces a qualification level output that is coupled to the digital logic 58. By this circuit arrangement the read signals from the head 31 cannot be passed to the control unit until a preselected threshold level of read signal amplitude is reached.

The threshold set 61 receives a set threshold level output from the control unit 37. A qualification level of X% of threshold level was chosen at design to be 22% based on a tradeoff between two competing factors. If the qualification level is too low, then any noise signal will corrupt the data stream. If the qualification level is too high, then weak but still valid analog signals may be lost. Weak signals can happen because of slight media defects or particulates on the media. If the amplitude of the analog signal exceeds the selected 22% then the X% of threshold qualify 62 enables the digital logic to pass qualified read data to the control unit. If the amplitude of the analog signal is less than 22% of the threshold level then there is no qualified read data passed to the control unit.

Referring now to FIG. 4 a graph shows the relationship of head read out signal amplitude and read gap position relative to the edge of the tape. The read-write head 31 has a write gap 64 and a read gap 65 when the read gap 65 is off the tape there is no head read signal amplitude. The graph shows that when the read gap 65 is just below the edge of the tape there is no head read signal amplitude but when the head is moved up beyond this point a read out signal is present which increases in amplitude in a linear manner as the gap is moved up the tape. A point of maximum amplitude is reached from which no further increase in amplitude is obtained. The three curves represent three different tapes. Curve 67 is a high output media, curve 68 a normal media and curve 69 a low output media.

Referring now to FIG. 5 there is shown the initial portion of the tape 21 which is divided into a second BOT (bottom of tape) area 71, first BOT area 72, preload point area 73, and user data area 74. The second BOT area 71 is used in connection with the sequence of operation for the non-write protected tape and the first BOT area 72 is used in connection with the sequence of operation for the write-protected tape. Holes 75 serve to locate areas 71, 72, 73 and 74.

Figure 6:
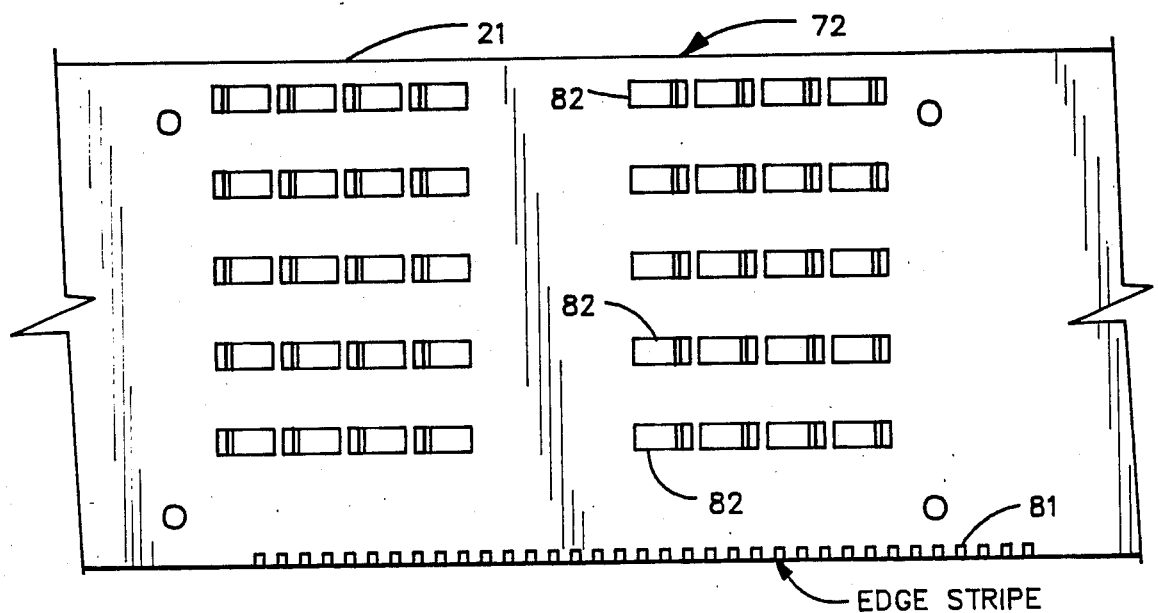
FIG. 6 is an enlarged view of the first bottom area of the tape shown in FIG. 4.

In FIG. 6 there is shown an enlargement of the first BOT area which contains the edge data stripe 81 along one edge. A plurality of other data stripes 82 are shown in this area which may be used to support other features.

Figure 7:
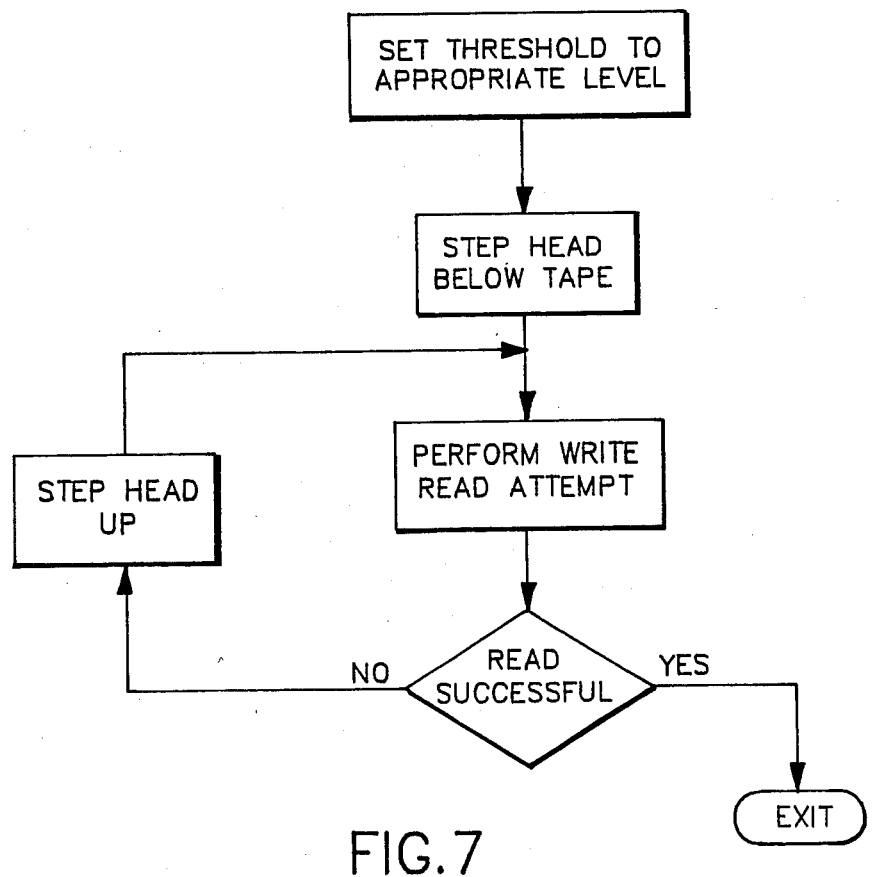
FIG. 7 is a flow chart for the program for locating an edge of the tape using a preselected read threshold level.
Figure 8:
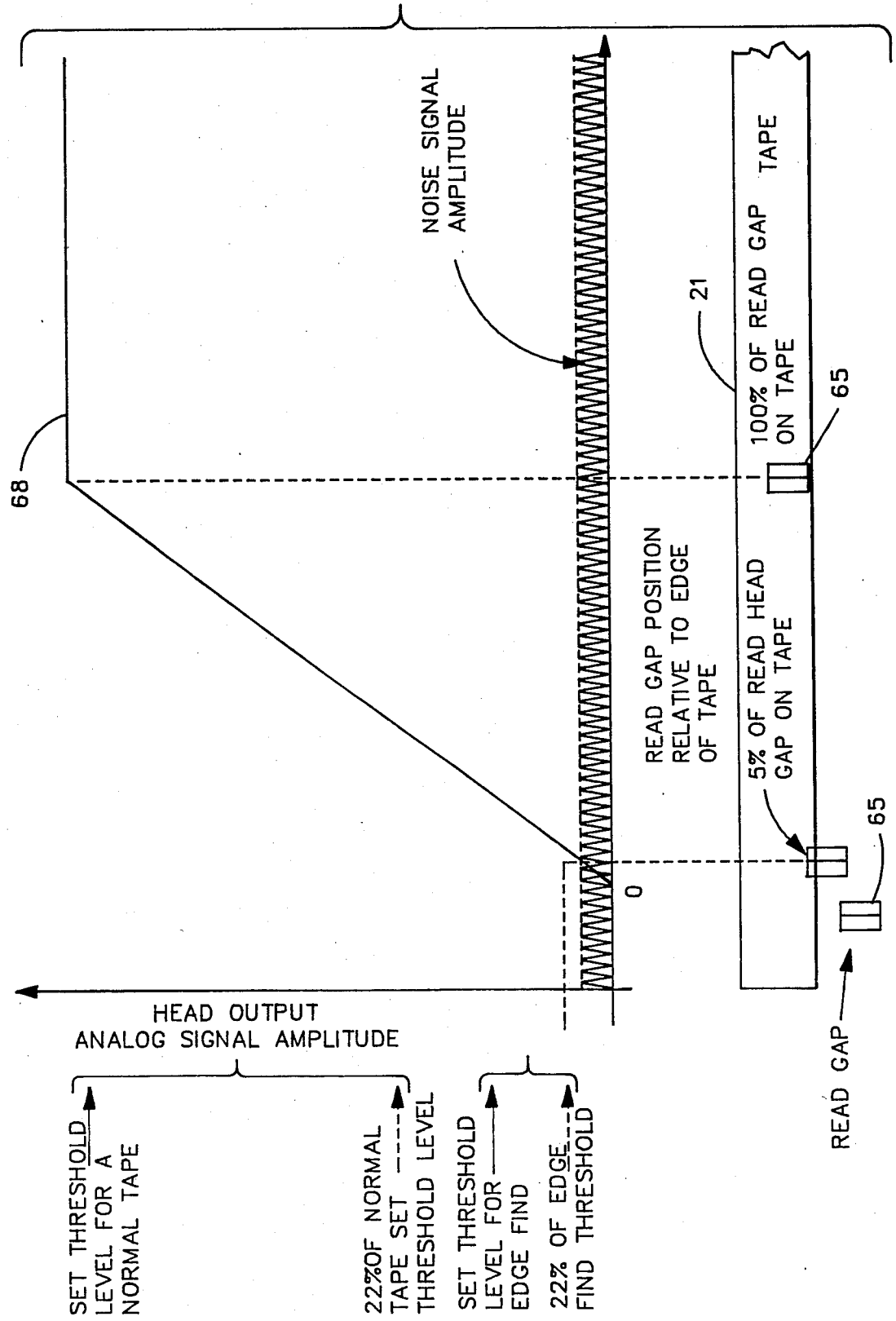
FIG. 8 is another graph showing the relationships of head read gap position on the tape to the head output analog signal amplitude particularly for the edge find operation.

Referring now to FIG. 7 a generalized flow chart shows the basic steps being used in locating the edge of the tape with the threshold level of the read out signal amplitude being set at a preselected level. As seen in FIG. 8 for the edge find operation, the control unit lowers the threshold level output in order to increase data sensitivity and the edge find accuracy. To determine if the head is on the tape, the control unit looks for a specific data pattern which is passed through the X% threshold circuit The low qualification level allows any data signal larger than the noise level to pass through to the control unit. Therefore, the data pattern can be detected when only a small portion of the read gap is positioned over the tape. In the implementation of the present invention a range of 3-5% (0.0002 to 0.0004 inches) of the head is over the tape when the pattern is detected. More precisely 5% has been found to be the preferred amount.

In locating the edge of the tape the control unit 37 provides a sequence of control outputs to step the head below the tape, write a signal, attempt to read the signal back and if no read is successful the head is stepped up. This write, read and step sequence is repeated until a read out of data from the tape is achieved. Once the edge is located the control unit provides a control output to move the head a fixed distance from the edge to a selected data track which results in a precise aligning of the head over a previously written data track. This fixed distance is known because the edge of the tape is used as a reference point when the user data tracks are initially written. The known distance is converted into a corresponding number of step commands which are sent to the servocontroller from the control unit.

In the case of a write protected tape the control unit 37 provides a sequence of control outputs to attempt to read the prewritten edge stripe 81 and if no read is successful the head is stepped up. This read and step sequence is repeated until a read out of data from the tape is achieved. Once the edge is located the control unit provides a control output to move the head a fixed distance from the edge to a selected data track which results in a precise aligning of the head over a previously written data track as previously described.

Figure 9:
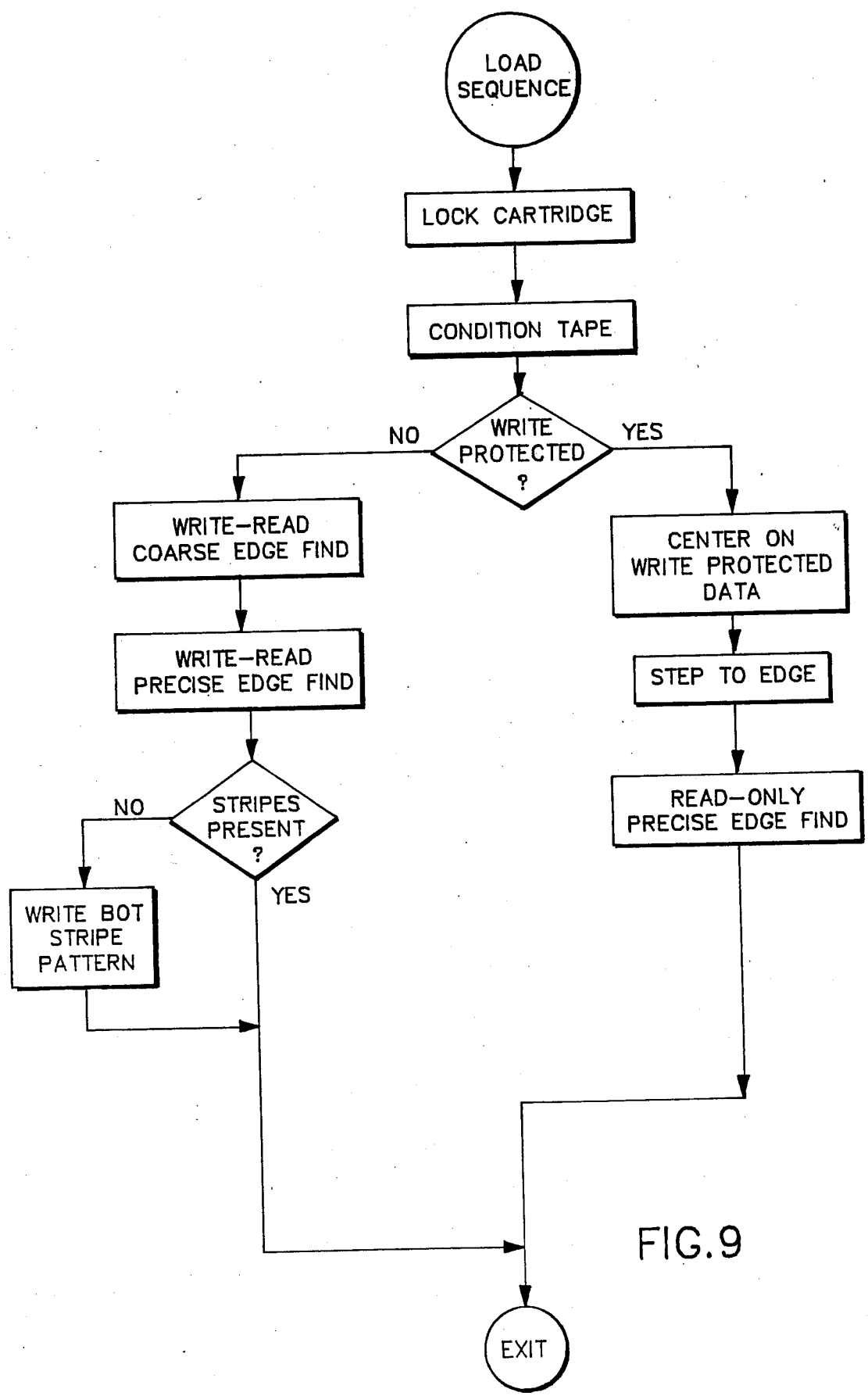
FIG. 9 is a flow chart of the program for the load sequence.
Figure 10:
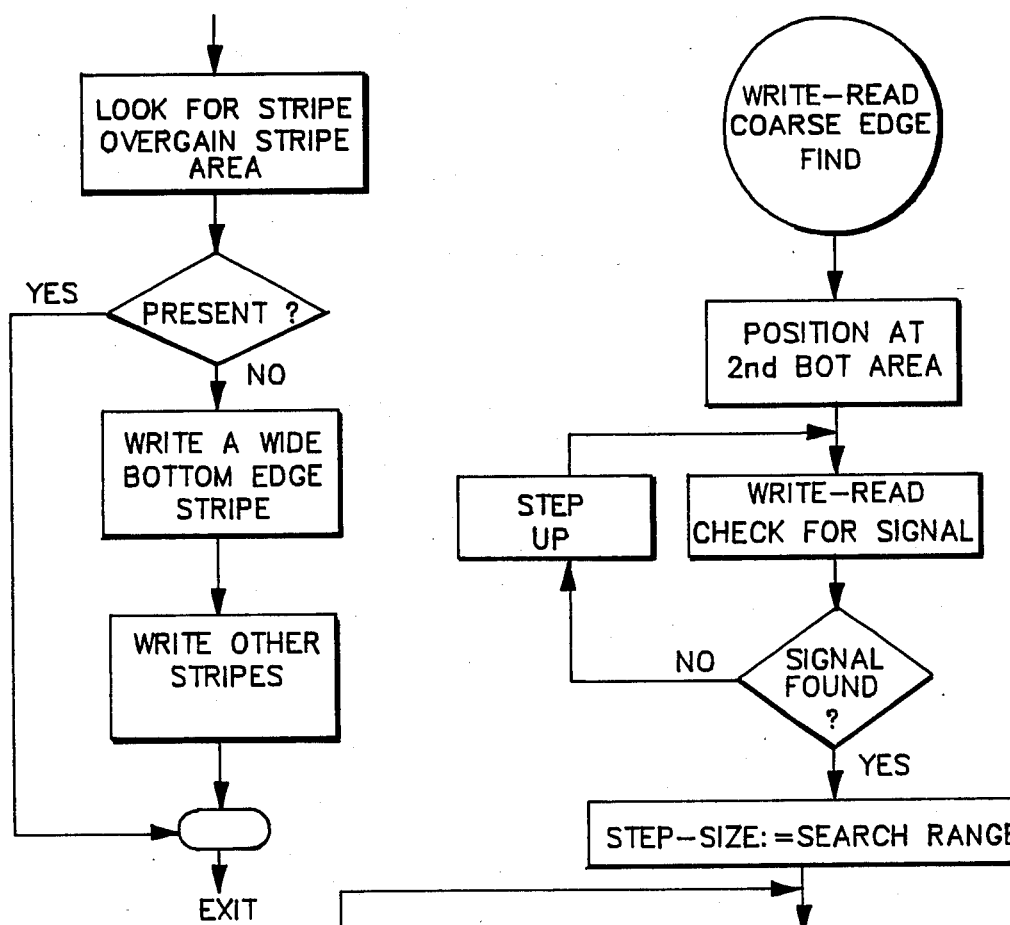
FIG. 10 is a flow chart for the program for the write BOT stripe pattern shown in FIG. 8.

Referring now to FIG. 9 there is shown a more detailed load sequence algorithm to accommodate both write protected and non-write protected tapes. The first step in loading a cartridge is to insure that a cartridge has been inserted and the read-write head is moved up a short distance which causes the locking device 31 to lock the cartridge 22 in place. If it is determined there is no cartridge present, the head is stepped back down to an unlocked position.

The tape is conditioned by being tensioned by moving the tape to the EOT (end of tape) end and then winding it to the BOT end. This tensioning reduces transient and permanent errors due to servo variations. During the tensioning the tape length is measured. This distinguishes between a long cartridge (600 feet) and a short cartridge (150 feet).

Figure 11:
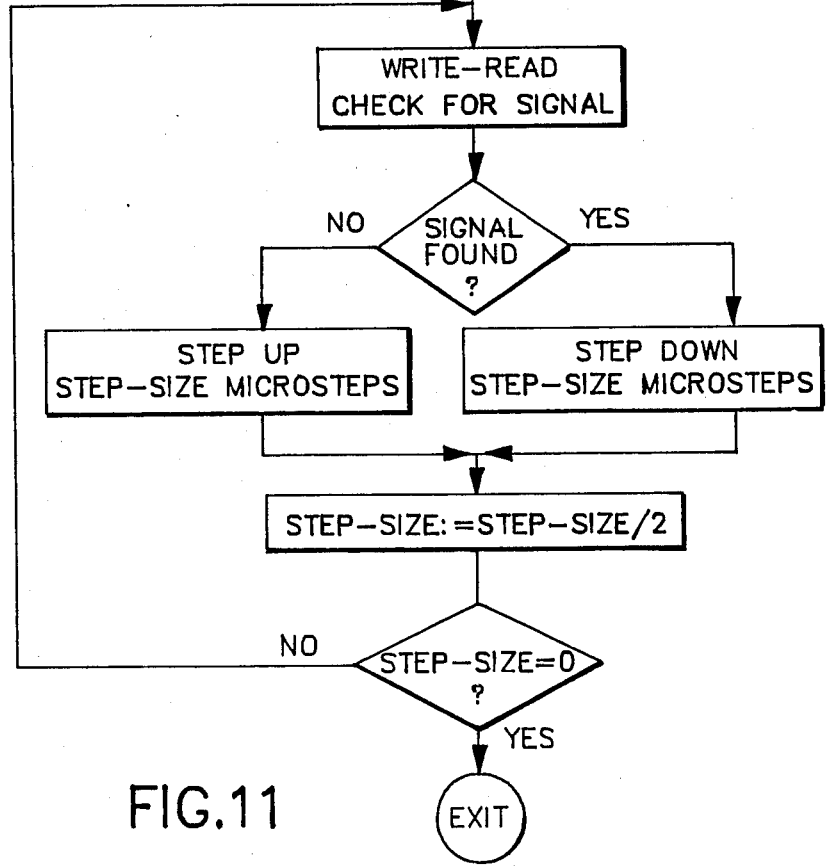
FIG. 11 is the flow chart of the program for the write-read coarse edge find.
Figure 12:
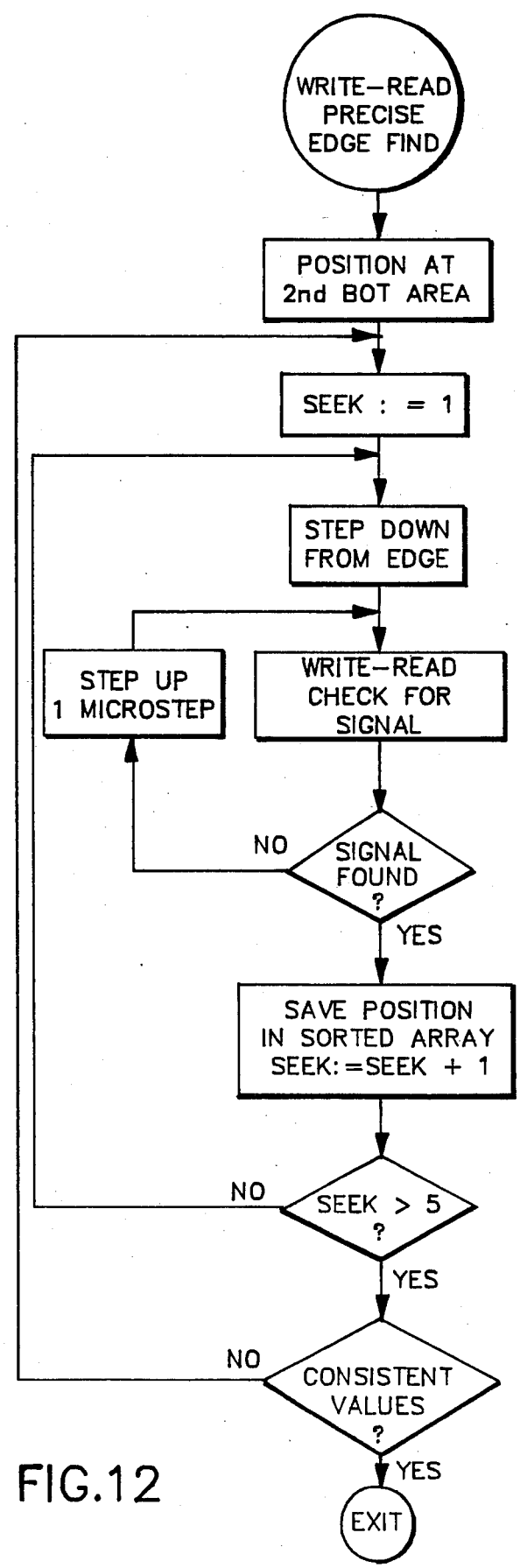
FIG. 12 is the flow chart for the program for the write-read precise edge find.
Figure 13:
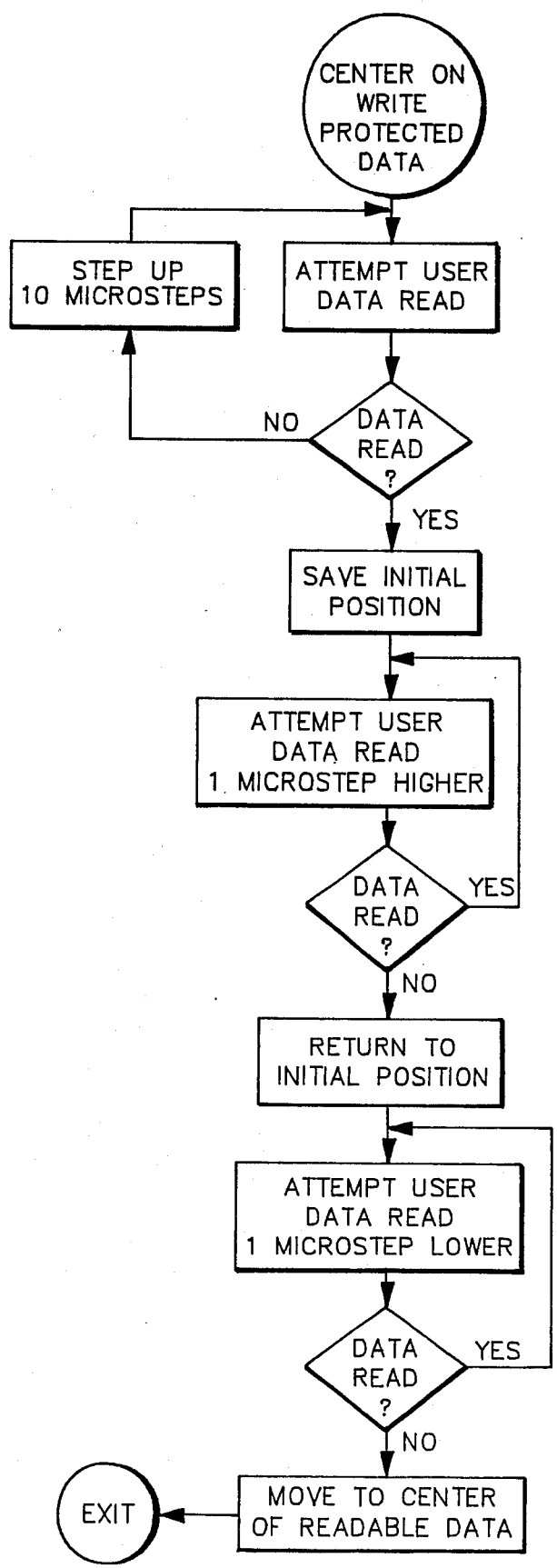
FIG. 13 is the flow chart for the program for the center on write protected data.
Figure 14:
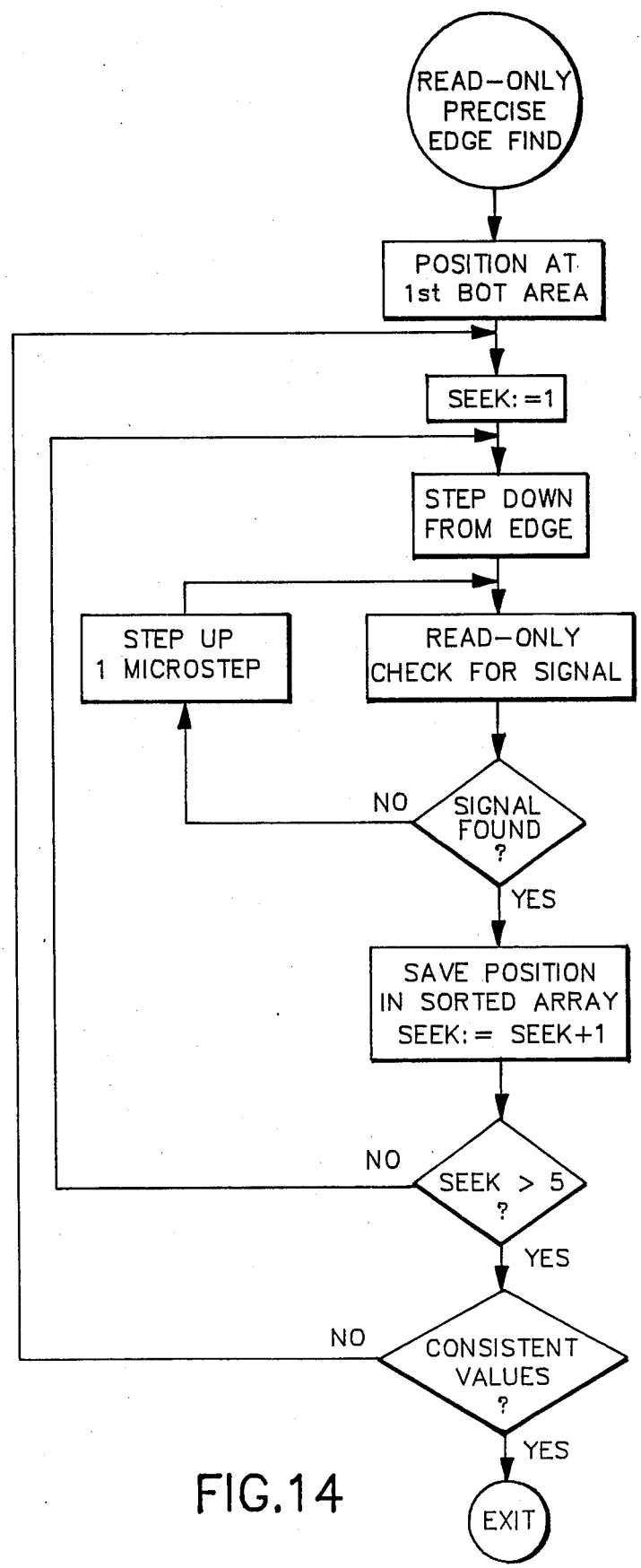
FIG. 14 is the flow chart for the program for read-only precise edge find.

Next, it is determined whether or not the tape is write protected. If the tape is not write protected it is first subjected to a write-read coarse edge find followed by a write-read precise edge find. Details of the write-read coarse edge find and write-read precise edge find are shown in FIGS. 11 and 12, respectively. The write-read coarse edge find uses the second BOT area 71 shown in FIGS. 5 and 6. First, the head must be positioned over the tape. To do this the signal is written, attempted to be read and if no signal is detected the head is moved up and the steps repeated until a signal is detected.

Once a signal is detected a binary search is performed. In the binary search data is written and attempted to be read. If a signal is found the head is moved down. If a signal is not found the head is moved up with the stepping interval becoming smaller by a factor of two each time. The search ends when the stepping interval becomes one. At this point the head is at a location where a signal can be read either at the present position or one microstep higher.

Once the edge of the tape is found by the coarse edge find a precision edge find is performed. In the precise edge find the head is first stepped off the tape then a signal is written out and then reread while moving the head back onto the tape. The position at which the signal is accurately detected is noted.

This procedure is repeated 5 times to guarantee an accurate value. The five positions are saved in a sorted table. To determine if the values are consistent the lowest and highest positions are thrown out and the remaining positions are checked to guarantee they are within a 2 microstep range. The median value is used as the tape edge position.

Once the edge of the tape has been accurately located, a procedure is to look for an edge stripe 81 in the first BOT area 72. This edge stripe 81 must be present so that under write-protect conditions the head can be accurately positioned. If edge stripe 81 is not present then an edge stripe 81, and other optional stripes 82 to support other features are written on the tape. If these data stripes are already present then no changes are made. The flow chart for this procedure is shown in FIG. 9. The purpose of the procedure shown in FIG. 9 is to write a wide bottom edge stripe 81 so that under conditions of interchange and write protect a reliable signal strength is present for the edge find.

A coarse search is performed by first looking for a user data track. The head is stepped up and a signal is looked for and this sequence is repeated until a signal is found. Once read data is detected the center of the user data track is found by determining the highest and lowest locations on the user data track at which the data can be read. Since the user data track contains the location of that track with respect to the edge of the tape then the approximate location of the edge stripe 81 is known. Then a precise edge find is performed.

Referring again to the load sequence of FIG. 9 the signal stripe 81 writing on the tape when it was not write protected are used during the write protect case in order to find the edge of the tape. The first step in the write protect algorithm as seen in FIG. 12 is to find the edge stripe 81 on the tape. A precision edge find is made by stepping the head off the tape and bringing it back over the edge stripe in the same manner as in the non write protect case as is described with reference to FIG. 12. However the prewritten edge stripe is used rather than rewriting the edge stripe.

The apparatus as above described has been effective in accurately placing the head over a previously written data track to written an accuracy of about +/−1 mil. It further allows the storage of sixteen tracks of information on a ¼ inch magnetic tape.

What is claimed is:

1. In apparatus for aligning a read-write head over previously written data on a magnetic tape in a tape drive, the combination comprising:
   threshold control circuit for setting an amplitude level which is a set threshold level for edge find at which a read data output can be passed from a head read gap of the tape drive, said set threshold level for edge find corresponding to a read output amplitude when only a small portion of the head read gap is positioned over the tape during an edge find operation to increase the edge find accuracy, said set threshold level for edge find being increased by said control circuit to a set threshold level for a normal tape during a data read-out operation.

2. In apparatus as set forth in claim 1 wherein said threshold circuit has a qualification level of about 22% of edge find threshold.

3. In apparatus as set forth in claim 1 wherein said small portion is about 3 to 5% of said head read gap.

4. In apparatus as set forth in claim 1 wherein said small portion is about 5% of said head read gap.

5. In apparatus for aligning a read-write head over previously written data on a tape in a tape drive, the combination comprising:
   control means for a tape drive for locating one edge of the tape by providing a sequence of control outputs for positioning the read-write head beyond the edge of the tape, writing a signal
   to the read-write head, attempting to read a signal from the tape using the read-write head, and stepping the read-write head toward the tape and repeating said write, read and step sequence until a data signal from the tape is
   detected with a read circuit, said control means providing a control output for moving said head a fixed distance from said edge, to a selected data track on the tape for aligning said head over said data track edge, and
   a threshold circuit responsive to said control means for setting an amplitude level which is a set threshold level for edge find at which the read data output is passed from a head read gap of the tape drive, said set threshold level for edge find corresponding to a read data output amplitude when only a small portion of the head read gap is on the tape during an edge find operation to increase the edge find accuracy, said level being increased by said control means to a set threshold level for a normal tape during a data read-out operation.

6. In apparatus as set forth in claim 5 wherein in locating said one edge said sequence of control outputs first perform a coarse edge find followed by a precise edge find.

7. In apparatus as set forth in claim 6 wherein said precise edge find includes the stepping of the read-write head off the tape, and a plurality of signal write-read operations are performed until a signal is found with the procedure of stepping the readwrite head off the tape and write-read operations repeated a selected number of times to check for accuracy.

8. In apparatus as set forth in claim 5 wherein said control outputs are sequenced so that after the edge is found if no edge stripe is detected by reading at a fixed location on the tape said control means provides a write data output to write a data stripe on a selected segment of the tape for use in locating the edge of the tape during an edge find operation of a write-protected tape.

9. In apparatus as set forth in claim 5 wherein said control means is in the form of a microprocessor-based controller.

10. In apparatus for electronically aligning a read-write head over previously written data on a tape in a tape drive, the combination comprising:
    control means for a tape drive for locating one edge of the tape by providing a sequence of control outputs for positioning a read-write head below the edge of the tape, writing a signal to the read-write head , attempting to read a signal from the tape using the read-write head, and stepping the read-write head up and repeating said write, read and step sequence until a digital signal
    from the tape is detected with a read circuit, providing a control output for moving said head a fixed distance to a selected data track previously recorded on the tape for aligning said head over said data track edge, and
    said control means providing a write data output to write a data stripe on a selected segment of the tape for use in locating the edge of the tape during an edge find operation on a write protected tape, a sensor to indicate to said control unit if the tape is write protected and if write protected said control means providing a different sequence of control outputs to locate the edge of said tape, a threshold circuit for setting an amplitude level which is a set threshold level for edge find at which the read data output can be passed from a head read gap of the tape drive, said set threshold level for edge find corresponding to a read output amplitude when only a small portion of the read head gap is on the tape during an edge find operation, to increase the edge find accuracy and subsequent reliability of reading out data from said tape.

11. In apparatus for aligning a read-write head over previously written data on a tape in a tape drive, the combination comprising:

control means for a tape drive for locating one edge of a tape by providing a sequence of control outputs to said tape drive for positioning a read-write head of the tape drive beyond the edge of the tape, writing a signal to the read-write head, attempting to read a signal from the tape using the read-write head, stepping the read-write head toward the tape and repeating said write, read and step sequence until a data signal from the tape is detected with a read circuit, wherein in locating said one edge said sequence of control outputs first perform a coarse edge find followed by a precise edge find, said coarse edge find including a binary search in which data is written on a segment of the tape, attempted to be read and if a signal is not found the head is moved with the stepping interval each time becoming smaller by a factor of two, said control means providing a control output for moving said head a fixed distance from said one edge to a selected data track on said tape for aligning said head over said data track.

12. In apparatus for aligning a read-write head over previously written data on a tape in a tape drive, the combination comprising:

control means for a tape drive for locating one edge of a tape by providing a sequence of control outputs to said tape drive for positioning a read-write head of the tape drive beyond the edge of the tape, writing a signal to the read-write head, attempting to read a signal from the tape using the read-write head, stepping the read-write head toward the tape and repeating said write, read and step sequence until a data signal from the tape is detected with a read circuit, said control outputs being sequenced so that after the edge is found if no data stripe is present on the tape said control means provides a write data output to write a data stripe on a selected segment of the tape for use locating the edge of the tape during an edge find operation of a write-protected tape, said control means providing a control output for moving said head a fixed distance from said one edge to a selected data track on said tape for aligning said head over said data track, and a sensor to indicate to said control unit if the tape is write-protected and if write-protected said control means providing a different sequence of control outputs to locate the edge of the tape.

13. In apparatus as set forth in claim 12 wherein for a write-protected tape said control means provides a sequence of control outputs to move said head to first step the head off the tape and bring the head back over the tape to center on write protected data followed by stepping the head to the edge of the tape.

14. In apparatus as set forth in claim 13 wherein after said edge is found said control means provides control outputs to perform a precise edge find which includes the stepping of the head off the tape, and a plurality of signal write-read operations until a signal is found with the procedure repeated a selected number of times to check for accuracy.

* * * * *